United States Patent [19]

Floyd, Jr.

[11] Patent Number: 5,183,373
[45] Date of Patent: Feb. 2, 1993

[54] CIRCLE MARKING AND CUTTING GUIDE TEMPLATE

[75] Inventor: Burton R. Floyd, Jr., Williamsburg, Ky.

[73] Assignee: The Floyd and Gilbert Company, Williamsburg, Ky.

[21] Appl. No.: 778,525

[22] Filed: Oct. 18, 1991

[51] Int. Cl.$^5$ .................. B23C 1/20; B27C 5/10; B43L 9/04
[52] U.S. Cl. .................. 409/179; 33/27.03; 144/134 D
[58] Field of Search .............. 409/175, 179, 126.31, 409/111, 112, 125, 182, 180; 33/27.03, 27.031, 27.032, 27.033; 144/134 D, 144.5

[56] References Cited

U.S. PATENT DOCUMENTS

| | | | |
|---|---|---|---|
| 1,576,800 | 3/1926 | Tibony | 33/27.03 |
| 2,595,081 | 4/1952 | Johnson | 33/27.03 |
| 2,693,134 | 11/1954 | Mole | 409/179 |
| 3,081,545 | 3/1963 | Bergman | 33/27.03 |
| 3,276,326 | 10/1966 | Gibbons | 409/179 |
| 3,292,494 | 12/1966 | Anderson | 409/179 |
| 3,491,448 | 1/1970 | Quinton et al. | 33/27.03 |
| 3,635,268 | 1/1972 | Lange | 144/134 D |
| 3,782,431 | 1/1974 | Cox | 144/144.5 |
| 4,143,691 | 3/1974 | Robinson | 144/134 D |
| 4,267,638 | 5/1981 | Heinz | 33/27.03 |
| 4,290,719 | 9/1981 | Worthington | 409/180 |
| 4,294,297 | 10/1981 | Kieffer | 144/134 D |
| 4,323,100 | 4/1982 | Silken | 144/134 D |
| 4,353,672 | 10/1982 | Smith | 409/97 |
| 4,538,946 | 9/1985 | Bloch | 409/179 |
| 4,630,657 | 12/1986 | Obradovich | 409/182 X |
| 4,685,496 | 8/1987 | Livick | 144/134 D |
| 4,911,214 | 3/1990 | Scott | 144/134 D |

FOREIGN PATENT DOCUMENTS 903223 2/1982 U.S.S.R. .............. 33/27.01

OTHER PUBLICATIONS

Downing, Wood Magazine, Feb. 1990, pp. 34–35.
Spielman, Router Jigs and Techniques, 1988, pp. 224–225.
Spielman, Reuter Basics, 1990, pp. 100–103.

*Primary Examiner*—William Briggs

[57] ABSTRACT

A template device and method for guiding a marking implement in marking circular lines upon a workpiece and, interchangeably, guides a router in its cutting engagement in following the marked circular lines. Comprising a planar member having paralleled opposed major faces, a guide plate includes a plurality of evenly spaced guide holes between a plurality of unevenly spaced guide holes. All holes are the same diamter, being aligned in the central portion of the guide plate. All holes interchange as pivot, radii marking or cutting guide holes. Bearings with shafts including center holes receive bushing that firmly contain and center a variety of workpiece penetrating and surface adhering pivot anchors and a variety of marking implements. The bearing shafts are insertable, rotatable, and easily removable from any hole within the guide plate. Center holes in bearing shafts also serve to view and center circular lines centerpoints on the workpiece and a preview of a planned circular line, prior to actual marking or cutting. Once the planned line is marked on the workpiece, the marking assembly is removed from the hole in the guide plate and a template guide, as attached to a hand held electric powered router, is reinserted in the guide hole. The guide plate is rotated about the pivot thereby guiding the router in the cutting engagement with the workpiece.

12 Claims, 2 Drawing Sheets

CIRCLE MARKING AND CUTTING GUIDE TEMPLATE

BACKGROUND

1. Field of Invention

This invention relates to a template, specifically, but not by way of limitation to such templates for guiding a marking implement in marking circular lines upon a workpiece surface and, interchangeably, provides for guiding a cutting tool, as a router, in following the marked lines being engaged with the workpiece surface.

2. Description of Prior Art

There are many methods used in marking circular lines upon a workpiece surface and then using a cutting tool, such as a router, complete with a guiding apparatus to follow the scribed circular pattern in cutting engagement with the workpiece. A circle scribing compass or actual sized circular cutout is used to scribe the circular pattern of the selected radius upon the workpiece. Once marked, a separate device, attached to the cutting tool, is employed by setting the pivot on the circle's centerpoint. The radius is set accordingly using the adjustment method provided in matching the path of the cutting bit with the circular pattern as marked. A variety of these guiding devices are disclosed within the prior art which utilize various methods in supporting and guiding the router in following marked or unmarked circular patterns on a workpiece surface. Each have advanced the art but have retained construction, adjustment, and operational disadvantages that are now overcome by the simple and versatile instant invention.

A common device is constructed of a convenient length of wood attached to the base of the router, allowing the cutting bit to extend below and into the workpiece. A nail is driven through the wood at a selected distance, the radius, from the cutting bit and is imbedded into the workpiece surface. Thus anchored, the attached router is rotated 360 degrees around the nail pivot cutting the circular groove.

A more adjustable version of this type was disclosed by Lange in U.S. Pat. No. 3,635,268, issued Jan. 18, 1972, wherein an adjustable sliding guide track was attached to the router base. Robinson in U.S. Pat. No. 4,143,691 issued Mar. 13, 1979 incorporated the apparatus in a permanent router base with mating guide pairs operating in a continuous radial slot.

These and all other variations in the art that provide for the circular guiding apparatus to be securely attached to the router base with screws, clamps or other fasteners, have the following disadvantages:

a) The attached electric power supply cord develops a new twist with each 360 degree rotation. The cord twist must be reversed by rotation of the tool in an opposite direction. Removing the cord plug from the electric receptacle, untwisting the cord, and reconnecting the plug may be done. This stress, can lead to cord breakage, loss of power, and electric shock hazard to the workman.

b) The workman must interrupt a continuous 360 degree cutting rotation about the pivot to exchange handholds on the right and left tool handles if he remains at a single workstation. The practice of releasing a high speed cutting tool can lead to accidents and injury to the workman.

c) The workman must walk completely around the workpiece in maintaining his original handhold on the tool's right and left handles. This is often impossible in small workshops where the workbench is frequently against the shop wall preventing 360 degree walk around movement by the workman.

d) The circular guiding apparatus attached to the base of the router must be elevated above the workpiece surface and held while being rotated about the pivot in order to preview the planned cut to be made when the apparatus is lowered in the cutting engagement with the workpiece surface.

e) Accurate measurements must be made in setting the pivot and the radius required to the cutting bit on the router to insure that the circular cut is constructed on the planned location on the surface. Workmen with impaired vision have difficulty in performing this task.

f) Pivot holes provided in prior art circular guiding apparatus are subject to enlargement by wear, making accurate circular groove or disc cutout repetition difficult as the apparatus is rotated around a loose fitting pivot. As this occurs, the device must either be repaired or retired from use.

g) Sliding arms, bars, and the like attached to the router's base, although providing infinite radii settings, are subject to wear and slippage in adjustment that can lead to miscuts and damage to the workpiece surface.

Another router guiding device for cutting circular grooves is disclosed in a template guide by Smith in U.S. Pat. No. 4,353,672 issued Oct. 12, 1982. The device contains a base plate, carriage assembly, and a template assembly. Although useful for routing certain designs, it is large and cumbersome for cutting large discs such as a tabletop. Other variations in the Smith device providing such guiding assemblies are also large and cumbersome for the simple task of routing circular grooves.

A template device containing various sized circular cutouts from thin material is disclosed in *Better Homes and Gardens WOOD* February 1990 issue 33, pages 34-35. The perimeter of the cutout is followed with the router equipped with a special piloted bit or template guide. The device, as taught, is useful for routing small circles. The device requiring a separate template for each diameter, also is unweildy for the large diameters like tabletops. Extreme care must be exercised to prevent straying of the cutting bit away from the edge of the template marring the workpiece.

There is a need for the present invention that overcomes the disadvantages heretofore described; that can be safely and accurately operated by the novice as well as the accomplished craftsman being readily adaptable for use with any hand held electric router.

SUMMARY OF THE INVENTION

The principal object of the present invention is to provide a template device for guiding, interchangeably, a marking implement or cutting tool, such as a hand operated electric router in the marking or cutting of circular designs upon a workpiece surface.

It is also an object of the present invention to provide such a device which is inexpensive, requires little maintenance, and is accurately and easily operated.

Another object is to provide a simple, accurate method for viewing centerpoint locations; and a method for quickly previewing the proposed circular pattern prior to actual marking or cutting the workpiece, in order to better include and exclude certain surface features.

Another object is to provide a device wherein each functional assembly for pivot anchoring, workpiece marking and cutting circular patterns are each interchangeable and operable within each guide hole provided in the guide plate.

Another object is to provide for radii adjustment of circular patterns by arrangement of evenly spaced and unevenly spaced guide holes in the guide plate.

Another object is to provide a device that will not get out of adjustment with repeated use.

Another object is provide a circular marking device adaptable to a variety of marking implements.

Providing a circle marking and cutting guide adaptable to a variety of workpiece penetrating and surface adhering methods of pivot anchoring is another object of the present invention.

Further objects of the present invention are to provide a method for making 360 degree cuts with a router; the workman safely maintaining his original handhold on the tool's handles as he remains at a single workstation position.

Providing a method whereby 360 degree circular rotations may be made repeatedly with a router in cutting circular grooves, discs, or consecutive rings from the workpiece eliminating all twist in attached electric power supply cord and chip vacuum line.

The foregoing objects can be accomplished by providing a planar member having paralled opposed major faces, a guide plate. A plurality of guide holes that intersect the opposed major faces of the guide plate. A bearing comprising a shaft portion having a center hole. The bearing shaft being firmly insertable and rotatable within each of the guide holes in the guide plate and removable therefrom. An inside diameter reduction bushing that is firmly insertable and rotatable within the center hole of the bearing shaft. The combination of the pivot anchor, a marking implement, and a template guide equipped cutting tool, as a router, each being firmly insertable and rotatable within each of the guide holes, all fully interchangeable, is the instant invention and its method of operation taught herein.

These and other objects and advantages of the present invention will be understood by following the detailed description of the preferred embodiment with reference being made to the accompanying illustrative drawings.

REFERENCE NUMERALS

10—Guide Plate
12,14,16,18,—Evenly Spaced Guide Holes
20,22,24,26,—Unevenly Spaced Guide Holes
28—Recess in guide plate
30—Bearing (includes 32,34,35)
32—Bearing Flange
34—Bearing Shaft
35—Bearing Shaft Center Hole
36—Inner Diameter Reduction Bushing
38—Pivot Anchor Implement (nail illustrated)
40—Marking Implement (pencil illustrated)
42—Workpiece Surface
44—Marked Circular Line
46,48,50,—Router Tool Orientation
L,R,—Router Tool's Left and Right Handles
52—Molded Adhesive Button Pivot Anchor
54—Suction Cup Pivot Anchor
56—Pivot Anchor Taping Flange
58—Template Guide on Router Tool
60—Adhesive Backed Tape
62—Cutting Bit
64—Magnetic Button Pivot Anchor
WSP—Workstation Position
→—Motion Line
EP—Electric Power Supply Cord

DETAILED DESCRIPTION

The disclosed embodiment of the present invention will be explained in detail. It is to be understood that the invention is not limited to the particular arrangement of details shown, since the invention is capable of many embodiments. The terminology used is for descriptive purposes and not of limitation.

Figure 1:
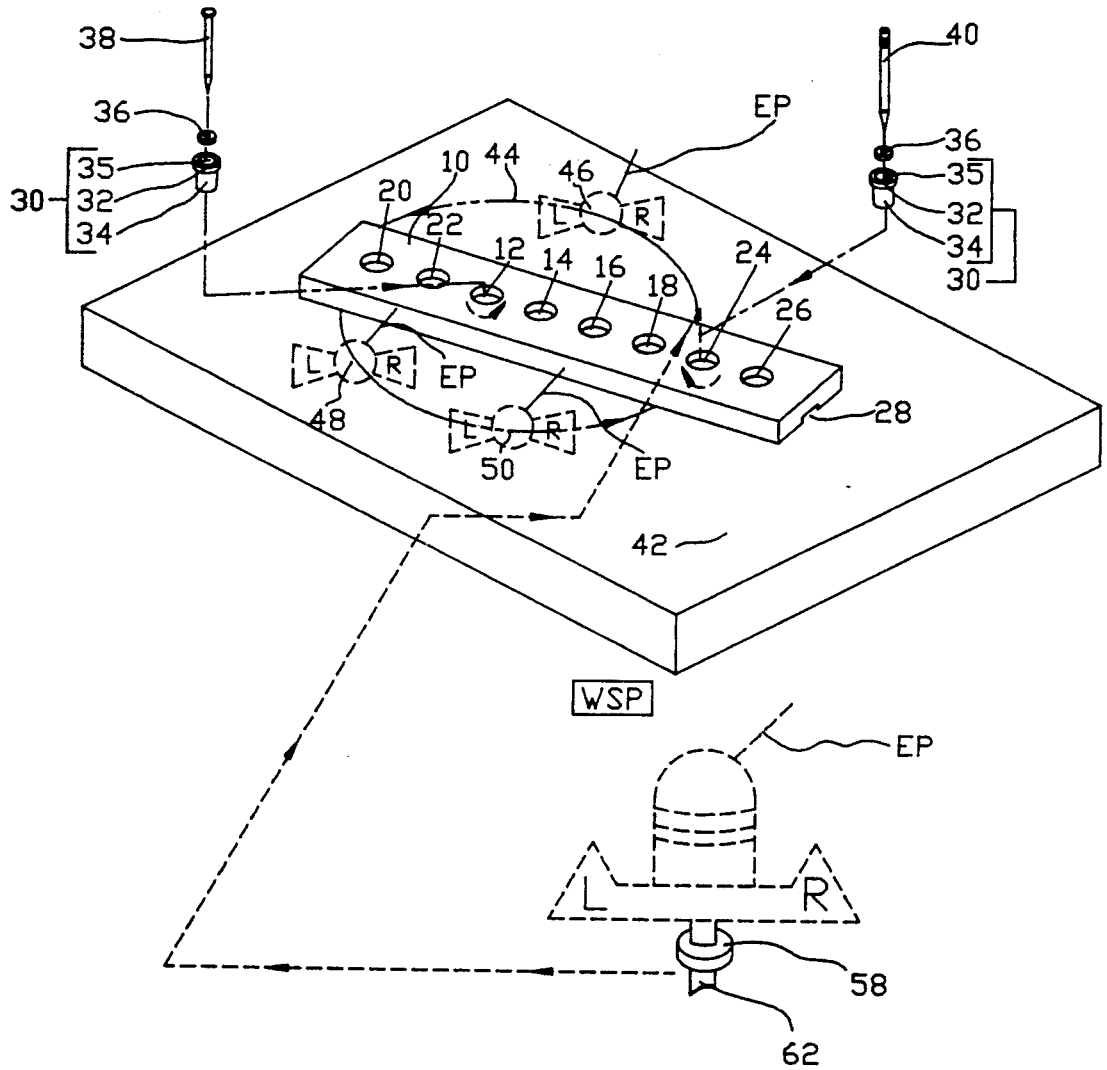
FIG. 1 is a perspective of the preferred embodiment of the instant invention as viewed from the top side.

As shown in FIG. 1, the preferred embodiment of the circle marking and cutting guide template of the present invention, hereafter referred to as a template device, is illustrated. A template device for guiding interchangeably, a marking implement 40 or cutting bit 62 as in a hand held electric powered router equipped with a template guide 58, in the marking or cutting of circular lines 44 in engagement with a workpiece surface 42 comprises: a guide plate 10, a planar member having paralleled opposed major faces, ideally being approximately 10.2 centimeters (4 inches) wide by 61.0 centimeters (24 inches) long and approximately 0.6 centimeters (¼ inch) in thickness. These dimensions are exemplary and other dimensions will be apparent to those in the art. The preferred construction material is a polycarbonate as marketed under the trade name LEXAN by General Electric. Other planar materials such as acrylic, metal, wood, or composites can be used.

All of the outside edges of guide plate 10 are slightly beveled to prevent hanging on imperfections on the workpiece surface 42, thereby providing for a smooth movement as the guide plate 10 is rotated about the pivot as illustrated as being in guide hole 12.

Guide plate 10 comprises a plurality of guide holes 12,14,16,18,20,22,24,26, all of which are the same diameter ideally 1.9 centimeters (¾ inch), extending through the paralleled opposed major faces of the guide plate 10. Guide holes 12–26 are shown for illustration, the total number and diameter of which may be varied by those in the art. A plurality of evenly spaced guide holes 12,14,16,18, ideally on 2.5 centimeter (1 inch) centers are aligned in the central portion of guide plate 10 between a plurality of unevenly spaced guide holes 20,22,24,26, being in alignment with and positioned at either end of the evenly spaced series of guide holes 12,14,16,18.

For example, the center of hole 22 is ideally located 2.8 centimeters (1⅛ inch) from the center of hole 12, the nearest of the evenly spaced holes 12,14,16,18.

The center of hole 20 is ideally located 9.5 centimeters (2¾ inches) from hole 12. Located on the other end of the evenly spaced series of guide holes 12, 14, 16, 18, the center of hole 24 is ideally located 3.2 centimeters (1¼ inches) from the center of hole 18, nearest of the evenly spaced holes 12,14,16,18. The center of hole 26 is ideally located 6.4 centimeters (2½ inches) from the center of hole 18, the nearest of the series of evenly spaced holes 12,14,16,18.

This arrangement of evenly spaced guide holes 12,14,16,18 and unevenly spaced guide holes 20,22,24,26 provides great versatility when used in combination as the pivot and radii in scribing a variety of fractional radii increments. In the example as illustrated, hole 12 in combination with hole 24 would be used to scribe a circle having a radius=10.7 centimeters (4¼ inches). Hole 22 in combination with hole 14 would provide a radius=5.3 centimeters 2⅛ inches). The combination of hole 12 and hole 16 would scribe a circle having a radius=5.0 centimeters (2 inches).

Since each of the guide holes 12-26 are all of the same diameter, one readily understands that any of the holes 12-26 may be used as the centerpoint and pivot for the circle to be scribed and that any guide hole 12-26 may be used as the defined radius from the pivot (centerpoint of the circle) to scribe a circular line with either a marking implement 40 or router cutting bit 62.

The spacing arrangement disclosed is illustrative only, and one in the art can readily see that the combinations for the plurality of guide holes within the guide plate are many. Likewise, the instant invention may be changed in length and in the number of guide holes 12-26 provided.

A bearing 30 comprising a flange 32, a bearing shaft 34 and a bearing shaft center hole 35 is provided in accomplishing two different functions. Ideally constructed of powdered metal, any dimensionally stable material used in the art for bearing construction may be used. A first bearing 30 is identical to a second bearing 30, also required.

A first bearing 30 shaft 34 is firmly insertable and rotatable within guide hole 12, and is easily removable therefrom. Hole 12 is illustrated as receiving bearing shaft 34, however any guide hole 12-26 will also receive bearing 30 shaft 34. The first bearing shaft center hole 35 receives, firmly and rotatably, an inner diameter reduction bushing 36 having an inside hole diameter that firmly contains a pivot anchor implement 38. A nail is illustrated, however, other workpiece surface 42 penetrating pivot anchors comprising a bolt, screw, metal push point, tack or brad can be used. The pivot anchor implement 38, bushing 36, and bearing 30 completes the assembly for the pivot point establishing the center of the circular line 44 to be marked.

A plurality of nonpenetrating or surface 42 adhering pivot anchors 38 are also contained by bearing 30 and bushing 36 adding versatility to the instant invention. FIG. 3, FIG. 4, FIG. 5 and FIG. 6 illustrate the use of the surface adhering anchors of a molded adhesive button 52, suction cup 54, pivot anchor taping flange 56 and a magnetic button pivot anchor 64, respectively.

Reference is made to FIG. 1. A second bearing 30 shaft 34 is firmly insertable and rotatable within guide hole 24, and is easily removable therefrom. Hole 24 is illustrated as receiving bearing shaft 34, however, any guide hole 12-26 will also receive bearing 30 shaft 34. The second bearing shaft center hole 35 receives, firmly and rotatably, a bushing 36 having an inside hole diameter that firmly contains a marking implement 40. A pencil is illustrated, however, marking implements 40 comprising a pen, chalk, tube marker, metal scribing point, crayon or knife point can be used. Bushing 36 is used to center the marking implement 40 point in guide hole 24, whereby the circular line 44 can be scribed upon the workpiece surface 42.

Figure 2:
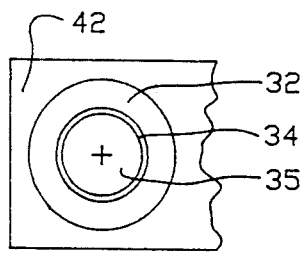
FIG. 2 is a top perspective of the bearing shaft center hole in viewing the adjustment in centering the pivot and radii points for the guide plate upon the workpiece surface.

Reference is made to FIG. 2 wherein bearing shaft center hole 35 is used in viewing the workpiece surface 42 in locating and centering the point where the pivot anchor implement 38 in FIG. 1 is to be established on the workpiece surface 42. The view of the surface 42 through the bearing shaft center hole 35 also enables the workman a quick and accurate method for previewing the immediate area of the circular line 44 prior to line 44 being actually marked or cut.

First and second bearings 30 previously described as being identical in all respects, may vary in length, flange diameter, thickness and construction material. The bearing shaft 34 outside diameter, however, must always be dimensioned to be firmly insertable and rotatable within the guide holes 12-26 or additional guide holes provided by one in the art.

The bushing 36 is used in centering the selected pivot anchor implement 38 or marking implement 40 within bearing shaft center hole 35 as bearing 30 is in position in a guide hole 12-26 in guide plate 10. Ideally constructed of plastic, other materials comprising wood, ceramic, rubber and metal can be used. Receiving most of the wear, bushing 36 is inexpensive in its replacement during maintenance. Bushing 36 is approximately 1.6 centimeters (⅝ inch) in outside diameter, and 0.3 to 0.6 centimeters (⅛ to ¼ inch) in thickness. Inner hole diameters of bushing 36 vary in receiving various pivot anchors 38 and marking implements 40. In certain applications, such as the use of the molded adhesive button pivot anchor 52 in FIG. 2, a bushing 36 will not be required.

Referring to FIG. 1, a recess 28 is provided in in one of the paralleled opposed major faces of guide plate 10, adjacent to and encircling each of guide holes 12-26. The recess 28 is wide enough to receive bearing flange 32 and of a depth at least equal to the thickness of flange 32 thereby enabling the flange 32 surface to be flush with the flat surface of guide plate 10. Shown as a groove, the recess 28 can also be a vertical sided countersink around the hole.

Reference is made to cutting the marked circular line 44 in FIG. 1 in the workpiece surface 42. A hand held electric powered router, equipped with a cutting bit 62 and a template guide 58, each being well known in the art, are required. The outside diameter of guide 58 equals the outside diameter of bearing shaft 34 being approximately 1.9 centimeters (¾ inch). The length of guide 58 as it extends below the plane of the router's bottom surface is slightly less than the thickness of guide plate 10. The router's template guide 58 is firmly insertable, rotatable within and easily removed from any of the guide holes 12-26 provided in guide plate 10. Removal of the marking implement 40 assembly from guide hole 24 after circular line 44 has been marked on the surface 42 allows the insertion of the router's template guide 58 into guide hole 24. Rotation of guide plate 10 about the pivot anchor implement 38 in guide hole 12 enables the cutting bit 62 as guided by the template guide 58 in hole 24 cut the desired groove on the surface 42 in following circular line 44.

Figure 5:
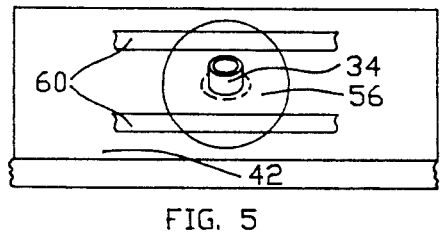
FIG. 5 is a top perspective illustrating a pivot anchor taping flange.

FIG. 5 illustrates a pivot anchor taping flange 56, comprising a thin planar material as a plastic approximately 0.15 centimeters (1/16 inch) in thickness and approximately 10.2 centimeters (4 inches) in diameter. A hole in the center of the taping flange 56 admits the bearing shaft 34. The taping flange is anchored to the surface 42 by an adhesive backed tape 60. Bearing shaft 34 extends upward from its secured position on surface 42 through the hole in the taping flange 56. The shaft 34 can now be overlain by the guide plate 10 being inserted in a guide hole 12 referenced in FIG. 1. This pivot anchor implement does not require the use of bushing 36, previously described.

Figure 3:
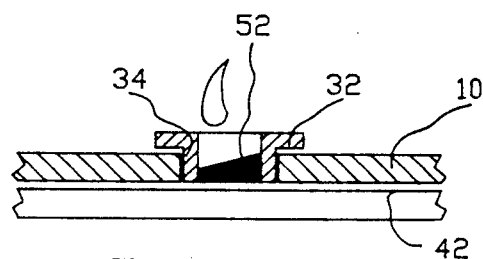
FIG. 3 is a fragmentary side view illustrating a molded adhesive button pivot anchor.

FIG. 3 illustrates a molded adhesive button pivot anchor 52 being constructed by using the hole in the inside of the bearing shaft 34 as a mold for filling with adhesive, thus forming the adhesive button 52. A hot melt glue gun, commonly used in the home and shop, is used to form the surface 42 adhering button 52. Button 52, can later be removed by separating it from the surface 42 using a chisel.

Figure 4:
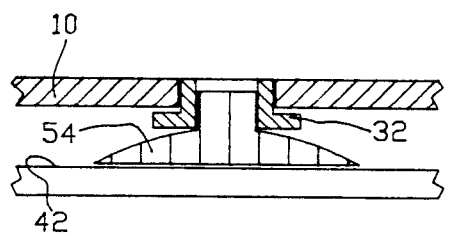
FIG. 4 is a fragmentary side view illustrating a suction cup pivot anchor.

In FIG. 4, a suction cup 54 is used as a surface adhering pivot point anchor around which guide plate 10 can be rotated. The suction cup is commonly constructed of rubber or vinyl and can be of any convenient size that provides a snug fit inside bearing 30 resting against flange 32.

Figure 6:
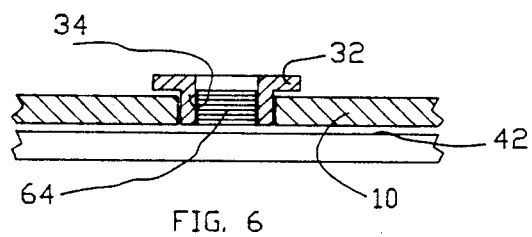
FIG. 6 is a fragmentary side view illustrating a magnetic button pivot anchor.

FIG. 6 illustrates a magnetic button 64 adhering to a steel surface 42 around which the guide plate 10 is rotated.

Reference is now made to FIG. 1 for references apart from the present inventions construction but are included to provide one with an understanding of the new method of operation and its advantages over prior art devices and methods. A counterclockwise rotation of guide plate 10 about the pivot in guide hole 12 is shown by motion arrows. Motion arrows within guide hole 24 show the countering movement in a clockwise direction of guide plate 10 around bearing 30 in marking line 44. The same movement applies to the router's template guide 58 as the router is used in cutting line 44.

Various positions of the router as it cuts the 360 degree circular line 44 are illustrated at router tool orientation 46, 48, 50. Also shown is the orientation of the router tool's left L and right R handles throughout the 360 degree cutting operation of circular line 44 as the guide plate 10 is used in guiding the tool around the pivot illustrated in guide hole 12. Important to note, is the orientation of the tool and its left L and right R handles and electric power supply cord EP in relation to a workman thus facing the workpiece from the workstation position WSP.

Figure 7:
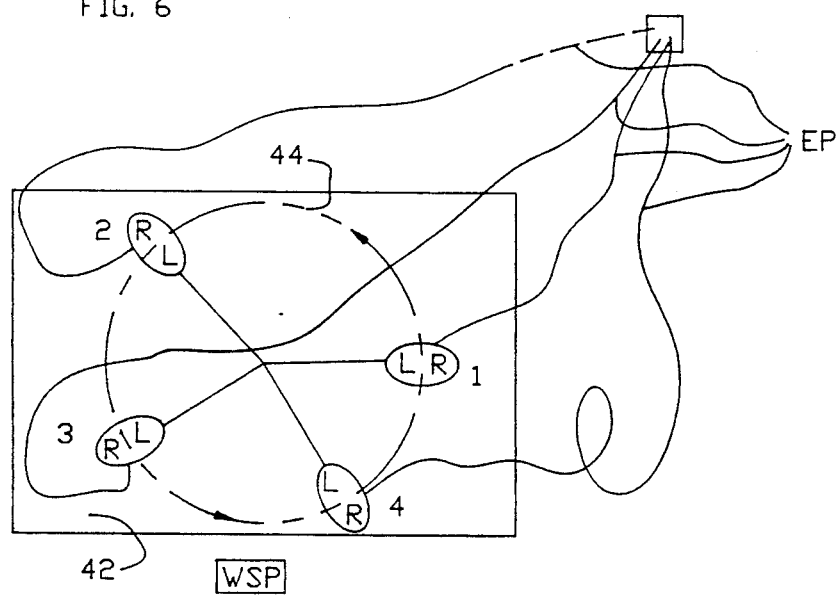
FIG. 7 is a diagram depicting a router tool's right and left handle orientation in 4 positions in a 360 degree rotation of a prior art circle cutting attachment that is firmly attached to the base of a router.

In contrast, the disadvantages of the prior art method of cutting the same 360 degree circular line 44 with a router having its base securely attached to one of the many prior art guiding apparatus is illustrated in FIG. 7. Orientation of the router, thus securely mounted to the apparatus, is shown in various positions on line 44. The tool's left L and right R handles are shown in their orientation to the pivot at the center of circular line 44 and in relation to a workman at workstation WSP. The router's attached electric power supply cord EP is also shown in the various positions. A loop in cord EP in position four on line 44 is illustrative of a twist developing in the cord EP with each 360 degree rotation of the router as secured to the prior art circle guiding apparatus. It should also be noted that it is impossible for a workman to maintain his original handhold, being the left hand on the left L handle, and the right hand on the right R handle throughout the cutting of circular line 44 and still remain at the workstation position WSP.

A novice, as well as the accomplished craftsman, can use the present invention safely and accurately. Circular lines can be marked, and the same lines followed effortlessly with the cutting bit of one's router in the layout and cutting of the workpiece. The use of the Circle Marking and Cutting Guide Template follows by referring to FIG. 1.

A workpiece is secured to a workbench, the workman facing the workpiece surface 42 from workstation position WSP. The center of the desired circular line 44 is located on surface 42. This center point is aligned in the center of a bearing 30 shaft centerhole 35 illustrated in FIG. 2.

FIG. 1 depicts a pivot anchor implement 38 contained firmly in an inner diameter reduction bushing 36 being inserted in bearing shaft center hole 35 and anchored to surface 42. Pivot anchor implement 38 is illustrated as a nail, but the workman can choose from a variety of anchor implements in best meeting the needs of a given situation. The familiar surface 42 penetrating anchors 38 such as a nail, bolt, screw, metal push point, tack, or a brad can be effectively used by being firmly inserted in an appropriate sized inner diameter of bushing 36, before being inserted in the bearing shaft center hole 35. These penetrating pivot anchors 38 are used where the hole left in surface 42 when removed may be repaired or is not objectional.

Surface adhering pivot anchors can also be used by the workman using the versatile device. FIG. 3 teaches the molding of an adhesive button anchor pivot 52 on surface 42. The bearing center hole 35 is lightly oiled to prevent the adhesive from sticking. Hot melt glue is then dripped in the mold formed by bearing 30, forming the button 52 on surface 42. The button 52 after serving as the pivot, can be removed from surface 42.

FIG. 4 depicts another surface adhering anchor, a suction cup 54. Particularly useful on glass, plastic and other smooth surfaces, the suction cup 54 is pressed over the center point of the proposed circle on surface 42. The bearing flange 32 rests against the cup 54 completing the pivot assembly.

FIG. 5 illustrates a pivot anchor taping flange 56. Comprising a thin flat plate having a hole receiving bearing shaft 34. The flange 56 is taped to surface 42 with an adhesive backed tape, holding bearing shaft upright with the flange 32 against surface 42 completing the pivot assembly.

FIG. 6 completes the surface adhering pivot anchors compatible with the device, being a magnetic button 64. Adhering to only iron or steel surfaces, the magnetic button 64 is thus limited in application as a pivot anchor in guide plate 10. Surface 42 penetrating anchors 38 in FIG. 1 are used with bushing 36. The surface adhering anchors are centered by bearing shaft center hole 35 and do not require bushing 36 in the pivot anchor assembly.

The pivot for the center of the circular line 44 thus anchored to surface 42, guide hole 12 of guide plate 10 is placed over the pivot anchor 38 and bushing 36, plate 10 resting flat on surface 42. Bearing 30 shaft 34 is inserted firmly and rotatably in hole 12, bearing flange 32 resting on the top surface of guide plate 10. Bearing 30 can operate reversed, the flange 32 resting against surface 42. In this mode the guide plate 10 is installed over the entire assembly comprising implement 38, bushing 36, and bearing 30.

Recess 28 in one of the major parallel surfaces of guide plate 10, provides versatility to the device. Recess 28 allows bearing flange 32 to be seated flush with the guide plate 10 surface. The guide plate 10 surface can then lay completely flat against workpiece surface 42. Plate 10 can also be operated with the recess 28 face being on top, away from surface 42. In this mode, bearing flange 32 rests on the top surface of plate 10 in the pivot anchor assembly and thereby recessed in recess 28, provides a smooth, unobstructed surface on the guide plate 10, upon which the base of the router can move.

In facilitating the rotation of guide plate 10 over rough, irregular surfaces 42, plate 10 can be positioned with recess 28 being in the top plate 10 surface. Pivot anchor bearing flange 32 is placed down and against surface 42. The smooth, unrecessed face of guide plate 10 is supported slightly above surface 42 by the thickness of flange 32.

The pivot anchor assembly in hole 12 and guide plate 10 arranged, the workman selects a hole 24 in guide plate 10 being the radius length desired to mark circular line 44 upon surface 42. Marking implement 40 comprising a pencil, pen, chalk, tube marker, metal scribing point, crayon, or knife point can be used. Implement 40 is centered firmly in bushing 36 inserted in bearing shaft center hole 35, the completed marking assembly then firmly inserted in guide hole 24. The guide plate is rotated counterclockwise a full 360 degrees around the pivot previously set in hole 12, thereby marking circular line 44 upon the workpiece surface 42. Prior to actually marking the surface 42, the workman can rotate the guide plate 10 360 degrees viewing the immediate path on surface 42 through guide hole 24 prior to the insertion of marking implement 40 and bushing 36 in hole 24. This preview of workpiece surface 42 features allows the workman to make any last minute changes by relocating the centerpoint pivot in order to include desirable grain patterns or to exclude certain defects with circular line 44 when marked. This accurate and rapid preview of proposed circular lines 44 is of particular benefit where such lines are being cut with the router blind, no premarked line being located on surface 42.

Circular line 44 now being marked on surface 42, the marking assembly comprising implement 40, bushing 36, and bearing 30 is removed from its position in guide hole 24 in the guide plate 10. The hand held electric powered router is now quickly interchanged with the marking assembly in hole 24, in the guide plate 10. Template guide 58 extending below the plane of the bottom surface of the router and encircling the router's cutting bit 62 is inserted firmly in hole 24, the base of the router resting on the planar surface of guide plate 10. The workman, at workstation WSP grips the router's left L handle in his left hand and the right R handle in his right hand. The router is moved in a counterclockwise direction over the workpiece surface 42 thus guided on the circular line 44. The advantage of this new method of cutting 360 degree circular lines 44 is revealed in the router orientation positions 46, 48, 50 in FIG. 1. As the cutting operation proceeds, the workman is able to safely maintain his original handhold on the tool's handles as the cutting operation proceeds in the 360 degree rotation about the pivot, as he remains at workstation position WSP. As one studies the router orientation positions 46, 48, 50. and the position of the router's electric power supply cord EP, another new safety feature is presented by the present invention and its new operating method for router cutting circular line 44. Electric power supply cord EP on the router also maintains the same orientation throughout the 360 degree rotation to workstation WSP and an electric power receptacle in which the cord EP is attached. Regardless of the number of 360 degree rotations made by the router around circular line 44, cord EP will not incur a single twist. FIG. 7, illustrating prior art disadvantages of routing circular lines 44 wherein the circle guiding apparatus is firmly attached to the router's base is included in contrast to the new art, as previously disclosed. The cord EP stressing twist developing with each rotation, requiring a reversing method in rotation to remove, soon damages the cord EP covering and interior electrical wiring. A cord EP thus damaged is a potential electrical shock hazard to the workman. Loss of power to the tool can also occur.

While the above description contains many specificities, these should not be determined as limitations on the invention. Many variations are possible within the scope of the invention. For example, bearing 30 may be used without the flange 32 and also without bushing 36 in the the pivot anchor and marking implement assemblies. Various shims can be provided on the lower face of the guide plate 10 thereby increasing the router's cutting bit 62 angle of entry in surface 42 making other than 90 degree vertical cuts possible. Overall shape, length, width, thickness can vary in application; the diameter, number, and spacing of guide holes 12-26 provided can vary considerably from the preferred embodiment disclosed in the drawings and specification. Coloring, numbering indicia, and other finishings may add appeal but will not be deemed as being outside the scope of the invention.

Accordingly, the scope of the invention should be determined not by the embodiment illustrated but by the appended claims.

CONCLUSION, RAMIFICATION AND SCOPE OF THE INVENTION

The reader has thus been taught that the circle marking and cutting guide template of the instant invention, provides a simple, accurate, and highly versatile device and method for previewing, marking and cutting circular patterns on a workpiece surface. Simple in design with few interchangeable and inexpensive parts, the present invention is virtually maintenance and adjustment free. Easily operated by a novice to the art, the present invention overcomes operational and safety disadvantages present in the prior art devices and methods for marking and adjusting for the cutting of circular lines with a router. A variety of radii in fractional increments are possible by the unique arrangement of evenly and unevenly spaced guide holes provided. The complete interchangeability of pivot anchors, marking assemblies, and cutting tool's being guided within any guide hole position of the device, and the variety of pivot anchors and marking implements accepted provides a versatility unequaled in prior art circle cutting devices and methods.

Using the circle marking and cutting guide template of the present invention, a workman can safely make 360 degree circular cuts with a router; the cuts can be completed from a single workstation position, the workman maintaining his original handhold on the tool handles, the tool's electric power supply cord oriented in preventing stressful twist.

The present invention, is universally adaptable for previewing, marking, and cutting 360 degree circular lines with any hand held electric powered router equipped with a properly sized template guide, as attached to its base, matching the guide hole diameter provided in the guide plate.

I claim:

1. A template device for guiding a marking implement in marking circular lines upon a workpiece and, interchangeably, for guiding a cutting bit as in a hand held electric powered router in following the circular lines in a cutting engagement with the workpiece surface comprising;
   a) a guide plate comprising a planar member having paralleled opposed major faces;
   b) a plurality of guide holes of equal diameter extending thru said major faces;
   c) said guide holes comprising a plurality of at least three evenly spaced holes in alignment;
   d) said guide holes further comprising a plurality of unevenly spaced holes;
   e) the spacing of said unevenly spaced holes being different from the spacing between said evenly spaced holes;
   f) said unevenly spaced holes located at the end of said alignment of evenly spaced holes;
   g) a first bearing containing pivoting means for said guide plate;
   h) said first bearing comprising a bearing shaft, having a center hole, said shaft insertable, rotatable and removable within each of said guide holes;
   i) a second bearing containing means for marking;
   j) said second bearing comprising a bearing shaft, having a center hole, said shaft insertable, rotatable and removable within each of said guide holes;
   k) said second bearing interchanging within one of said guide holes with a like diametered means encircling and centering a cutting bit.

2. The template device of claim 1, the guide plate further comprising a recess around said guide holes on one major surface of said plate, said recess admitting a bearing flange in a position flush with said major surface.

3. The device of claim 1, either said major surface applicable as a bottom surface, and in reverse, a top surface.

4. The template device of claim 1, a bearing shaft further comprising a flange.

5. The template device in claim 1, said center hole in bearing shaft reducible by a bushing in accepting
   a) a plurality of pivot anchor implements;
   b) a plurality of workpiece marking implements.

6. The template device in claim 1, said first bearing pivoting means further including a pivot anchor taping flange comprising
   a) a thin planar member having a hole substantially in its center;
   b) said hole admitting and supporting said first bearing shaft in an upright position;
   c) said taping flange and first bearing securable to a work surface with adhesive backed tape.

7. The template device in claim 1, a first bearing pivoting means further including a molded adhesive button pivot anchor comprising
   a) molded adhesive adhering to a work surface;
   b) said molded adhesive being accepted in said first bearing center hole;
   c) said first bearing being rotatable about said button.

8. A template device and method for guiding a marking implement in marking circular lines upon a workpiece and, interchangeably, for guiding a cutting bit, as in a hand held electric powered router in following the circular lines in a cutting engagement with the workpiece surface comprising;
   a) providing a guide plate comprising a planar member having paralleled opposed major faces;
   b) a plurality of guide holes of equal diameter extending thru said major faces;
   c) said guide holes comprising a plurality of at least three evenly spaced holes in alignment;
   d) said guide holes further comprising a plurality of unevenly spaced holes;
   e) the spacing of said unevenly spaced holes being different from the spacing between said evenly spaced holes;
   f) said unevenly spaced holes located at the end of said alignment of evenly spaced holes;
   g) a first bearing containing pivoting means for said guide plate;
   h) said first bearing comprising a bearing flange, bearing shaft and shaft center hole, said shaft being insertable, rotatable and removable within each of said guide holes;
   i) a second bearing containing means for marking;
   j) said second bearing comprising a flange, bearing shaft and shaft center hole, said shaft insertable, rotatable and removable within each of said guide holes;
   k) said second bearing interchanging within said guide hole with a like diametered means encircling and centering a cutting bit.

9. The template device and method in claim 8, in combination, evenly spaced and unevenly spaced guide holes in alignment in said guide plate defining center pivot and radius for constructing a plurality of circular lines with radii being in fractional increments.

10. The template device and method in claim 8, providing a center hole in the bearing shaft thru which a view of the workpiece can be made;
   a) in locating and centering the pivot anchor point;
   b) in previewing the immediate area upon the workpiece where a proposed circular line is to be marked or cut.

11. The template device and method in claim 8 whereby,
   a) said guide plate rotates 360 rotates about a pivot in a guide hole in said guide plate;
   b) a countering rotation occurring in the opposite direction within a guide hole defining the radius being cut;
   c) said countering rotation maintaining the same orientation in the router tool handles and attached electric power supply cord with respect to the workstation position whereby;
   d) the means and method for cutting 360 degree circular lines from a single workstation position enabling the workman to safely maintain his original handhold on the router tool handles, and all twist in the attached electric power supply cord being eliminated.

12. A template device for, interchangeably,. guiding a marking implement or guiding a cutting tool in constructing circular lines upon a workpiece surface comprising;
 a) a guide plate comprising a planar member having paralleled opposed major faces;
 b) a plurality of guide holes of equal diameter extending extending thru said major faces;
 c) said guide holes comprising a plurality of at least three evenly spaced guide holes in alignment;
 d) said guide holes comprising a plurality of unevenly spaced guide holes;
 e) the spacing of said unevenly spaced holes different from the spacing between the evenly spaced holes;
 f) said unevenly spaced holes located at the end of said alignment of evenly spaced holes;
 g) a first bearing means insertable, rotatable and removable within said guide holes providing pivot means for said guide plate;
 h) a second bearing means insertable, rotatable and removable within said guide holes containing marking means;
 i) said second bearing interchangeable with a like diametered guiding means encircling and centering a cutting tool within said guide holes in said guide plate.

* * * * *